(12) United States Patent
Carr

(10) Patent No.: US 10,489,359 B1
(45) Date of Patent: Nov. 26, 2019

(54) AUGMENTING STORAGE FUNCTIONALITY USING COMPOSITION

(71) Applicant: Amazon Technologies, Inc., Seattle, WA (US)

(72) Inventor: Jacob Shannan Carr, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 529 days.

(21) Appl. No.: 14/947,977

(22) Filed: Nov. 20, 2015

(51) Int. Cl.
*G06F 16/21* (2019.01)

(52) U.S. Cl.
CPC .......... *G06F 16/213* (2019.01); *G06F 16/214* (2019.01)

(58) Field of Classification Search
CPC ............. G06F 17/30297; G06F 17/303; G06F 16/213; G06F 16/214
See application file for complete search history.

(56) References Cited

U.S. PATENT DOCUMENTS

| | | | |
|---|---|---|---|
| 7,391,607 B2 | 6/2008 | Minami | |
| 7,539,836 B1* | 5/2009 | Klinkner | G06F 3/0605 711/170 |
| 8,090,810 B1* | 1/2012 | Insley | G06F 11/3051 709/223 |
| 8,266,099 B2 | 9/2012 | Vaghani | |
| 9,043,545 B2 | 5/2015 | Kimmel et al. | |
| 10,129,162 B1* | 11/2018 | Faulk, Jr. | H04L 47/33 |
| 2009/0019535 A1* | 1/2009 | Mishra | G06Q 10/00 726/12 |
| 2010/0332778 A1* | 12/2010 | Wada | G06F 3/061 711/162 |
| 2012/0102291 A1* | 4/2012 | Cherian | G06F 9/5044 711/170 |
| 2014/0025641 A1* | 1/2014 | Kumarasamy | G06F 17/30309 707/661 |
| 2014/0082279 A1* | 3/2014 | Kimmel | G06F 3/0605 711/114 |
| 2015/0046502 A1* | 2/2015 | Pandey | G06F 17/303 707/809 |
| 2015/0213011 A1* | 7/2015 | George | G06F 17/303 707/802 |
| 2015/0324182 A1* | 11/2015 | Barros | G06F 8/61 717/174 |
| 2016/0306581 A1* | 10/2016 | Belgaied | G06F 3/0605 |

* cited by examiner

*Primary Examiner* — James Trujillo
*Assistant Examiner* — Hubert Cheung
(74) *Attorney, Agent, or Firm* — Robert C. Kowert; Meyertons, Hood, Kivlin, Kowert & Goetzel, P.C.

(57) ABSTRACT

Methods, systems, and computer-readable media for implementing augmenting storage functionality using composition are disclosed. A logical data store is determined based at least in part on storage requirements specified by a user. The logical data store comprises a composition of a plurality of storage adapters for a plurality of physical data stores including a first storage adapter for a first physical data store and a second storage adapter for a second physical data store. The first storage adapter and the second storage adapter are associated with different storage characteristics. A plurality of storage requests for the logical data store are received. Individual ones of the storage requests are routed to the first physical data store using the first storage adapter. Individual ones of the storage requests are routed to the second physical data store using the second storage adapter.

20 Claims, 8 Drawing Sheets

AUGMENTING STORAGE FUNCTIONALITY USING COMPOSITION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Using such distributed systems, storage solutions may be implemented in cloud computing environments that offer multi-tenancy for storage resources. The features or functionality offered by individual storage solutions may vary. For example, the individual storage solutions may vary in terms of latency, throughput, security, consistency, and other attributes. Typically, a user chooses one type of storage solution to meet her or his needs for a particular set of data. In making such a choice, the user may have access only to the limited set of features provided by the selected storage solution for that particular set of data. If the user's needs change over time, the user may be required to manually initiate a time-consuming migration process from one type of storage solution to another type of storage solution.

Figure 1:
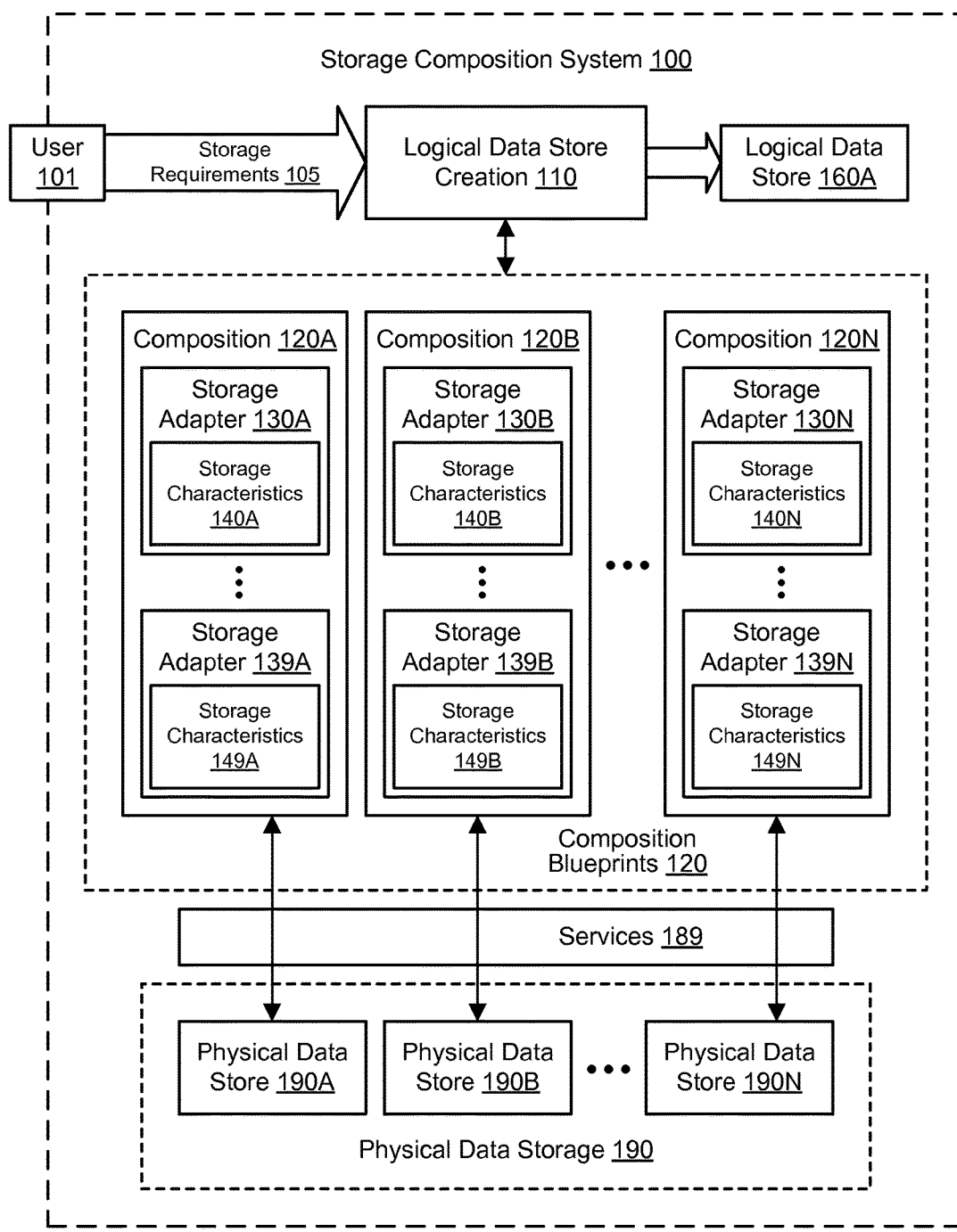
FIG. 1 illustrates an example system environment for augmenting storage functionality using composition, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for augmenting storage functionality using composition are described. As described herein, the features, functionality, or other characteristics of different storage solutions may be combined to provide composite storage solutions that meet the requirements of users. A storage composition system may store composition blueprints for various compositions. Each composition may include a plurality of storage adapters, and each storage adapter may enable the use of a particular type of physical data store and/or storage service. The physical data stores and/or storage services may represent underlying storage solutions for the compositions. The storage solutions may vary in storage characteristics such as latency, throughput, security, consistency, reliability, and cost, and the storage adapters may be associated with the particular storage characteristics of the corresponding physical data stores or services. By combining storage adapters, the compositions may combine the storage characteristics of a plurality of underlying storage solutions. Based on a specification of storage requirements (e.g., minimums, maximums, values, ranges of values, or priorities for latency, throughput, security, consistency, reliability, cost, and other storage characteristics), a logical data store may be created for a user based on a selected composition whose storage characteristics meet the storage requirements. The logical data store may include a plurality of storage adapters that communicate with a plurality of physical data stores and/or storage services having different storage characteristics. The user may interact with the logical data store (e.g., by sending suitable storage requests to the logical data store), and the use of the physical data stores and/or storage services may be transparent to the user (e.g., by transparently routing the storage requests to the physical data stores). In this manner, the functionality of storage solutions may be augmented using composition.

FIG. 1 illustrates an example system environment for augmenting storage functionality using composition, according to some embodiments. A storage composition system 100 may include components for combining the features, functionality, and/or attributes of various types of storage solutions. In one embodiment, the storage composition system 100 may include a functionality 110 for logical data store creation. Using the logical data store creation functionality 110, the storage composition system 100 may create, configure, modify, or otherwise determine a logical data store 160A for a particular user such as user 101. The particular user may be an individual or entity (such as a business organization) that is a client of the storage composition system 100. The user 101 may supply a specification of storage requirements 105 to the storage composition system using any suitable interface, such as an application programming interface (API) or user interface. The storage requirements may represent requested minimums, maximums, values, ranges of values, or relative priorities for storage characteristics such as latency, throughput, security, consistency, reliability, cost, and other suitable characteristics. In general, it is contemplated that the storage requirements may include any suitable functional requirements and/or performance requirements. Based on the specification of storage requirements, the logical data store creation functionality 110 may select one or more composition blueprints 120 as a basis for the logical data store 160A.

The composition blueprints 120 (also referred to as compositions) may include a plurality of compositions such as compositions 120A and 120B through 120N. Although three compositions 120A, 120B, and 120N are shown for purposes of illustration and example, it is contemplated that any suitable number and configuration of composition blueprints 120 may be used with the storage composition system 100. Each composition 120A-120N may include two or more storage adapters, and each storage adapter may enable the use of a particular type of underlying storage solution. Storage solutions may include various types of physical data storage 190 and/or storage services 189. As shown in the example of FIG. 1, composition 120A may include storage adapter 130A through storage adapter 139A, composition 120B may include storage adapter 130B through storage adapter 139B, and composition 120N may include storage adapter 130N through storage adapter 139N. In some embodiments, the same storage adapter may be included in a plurality of different compositions. Each of the storage adapters may be implemented as a driver or other set of program instructions executable (e.g., by computational resources within the storage composition system 100) to read data from and write data to a particular storage, e.g., over any intervening networks or interconnects and using any interface presented by the underlying physical storage solution. Any of the compositions 120A-120N may also include additional logic for managing data, e.g., by deciding which of the underlying storage solutions to access to satisfy a particular storage request.

As shown in FIG. 1, the physical data storage 190 may include a plurality of physical data stores such as data stores 190A and 190B through 190N. Although three data stores 190A, 190B, and 190N are shown for purposes of illustration and example, it is contemplated that any suitable number and configuration of physical data stores may be used with the storage composition system 100. The physical data stores 190A-190N may also be referred to herein as physical storage devices. However, it is contemplated that each of the physical data stores 190A-190N may include any suitable number and configuration of storage devices and computational resources configured to manage those storage devices. The physical data storage 190 may be managed using a plurality of different storage services 189. In one embodiment, each of the physical data stores 190A-190N may be managed by a particular one of the storage services 189. The storage services 189 may provide clients with access to storage solutions having different storage characteristics such as latency, throughput, security, consistency, reliability, and cost. For example, in comparison to each other, the physical data store 190A may be associated with a storage service that provides faster but more expensive storage, while the physical data store 190B may be associated with a storage service that provides slower but less expensive storage. In various embodiments, the physical data storage 190 may represent local storage managed by the services 189 (e.g., storage locally accessible to service hosts) as well as storage components external to the services over a network. As will be described in greater detail below, a composition 120A of the two physical data stores 190A and 190B may provide a user with transparent access to both the faster and slower storage solutions within the same logical data store 160A. The composition 120A may preserve the original functionality of the underlying storage solutions with respect to data elements that are stored with those storage solutions.

The storage adapters may be associated with the particular storage characteristics of the corresponding storage solutions, e.g., physical data stores and/or storage services. For example, storage adapter 130A may be associated with storage characteristics 140A, storage adapter 139A may be associated with storage characteristics 149A, storage adapter 130B may be associated with storage characteristics 140B, storage adapter 139B may be associated with storage characteristics 149B, storage adapter 130N may be associated with storage characteristics 140N, and storage adapter 139N may be associated with storage characteristics 149N. By including combinations of storage adapters, the compositions 120 may combine the storage characteristics of a plurality of storage solutions such as physical data stores 190A-190N. The logical data store 160A may be created for the user based on a selected composition whose storage characteristics meet the storage requirements. Any suitable heuristics may be used to select one of the compositions 120 for the user. In one embodiment, the compositions may be presented to the user in a user interface with descriptions of their functionality and features, and the specification of storage requirements 105 may represent the selection of one of the compositions.

The logical data store 160A may represent an organizational scheme for data such as one or more tables, scopes, or other data structures. The data elements in the logical data store 160A may be stored in suitable portions of the physical data storage 190 as accessed using the adapters in the selected composition. The logical data store 160A may be accessible to the user 101, but the underlying physical data storage 190 may be hidden from the user. The storage composition system 100 may be configured to create, manage, and provide client access to a plurality of logical data stores in a substantially simultaneous manner. The plurality of logical data stores may be created and managed on behalf of the same user or a plurality of users, e.g., such that the storage composition system 100 provides a multi-tenant storage environment. The logical data stores may also be referred to herein as logical storage devices.

The storage services 189 associated with the physical data storage 190 may be implemented according to a service-oriented architecture (SOA). Additionally, the logical data store 160A may be managed by a storage service that communicates with users (including user 101) as well as the physical data storage 190. A service-oriented architecture may include multiple services configured to communicate with each other (e.g., through message passing) to carry out various tasks. The services may be distributed across multiple computing instances and/or multiple subsystems which are connected, e.g., via one or more networks. In some embodiments, such services may be loosely coupled in order to minimize (or in some cases eliminate) interdependencies among services. This modularity may enable services to be reused in order to build various applications through a process referred to as orchestration. A service may include one or more components that may also participate in the service-oriented architecture, e.g., by passing messages to other services or to other components within the same service. The services may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.).

In general, services may be configured to perform any of a variety of business processes. The services described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

Figure 8:
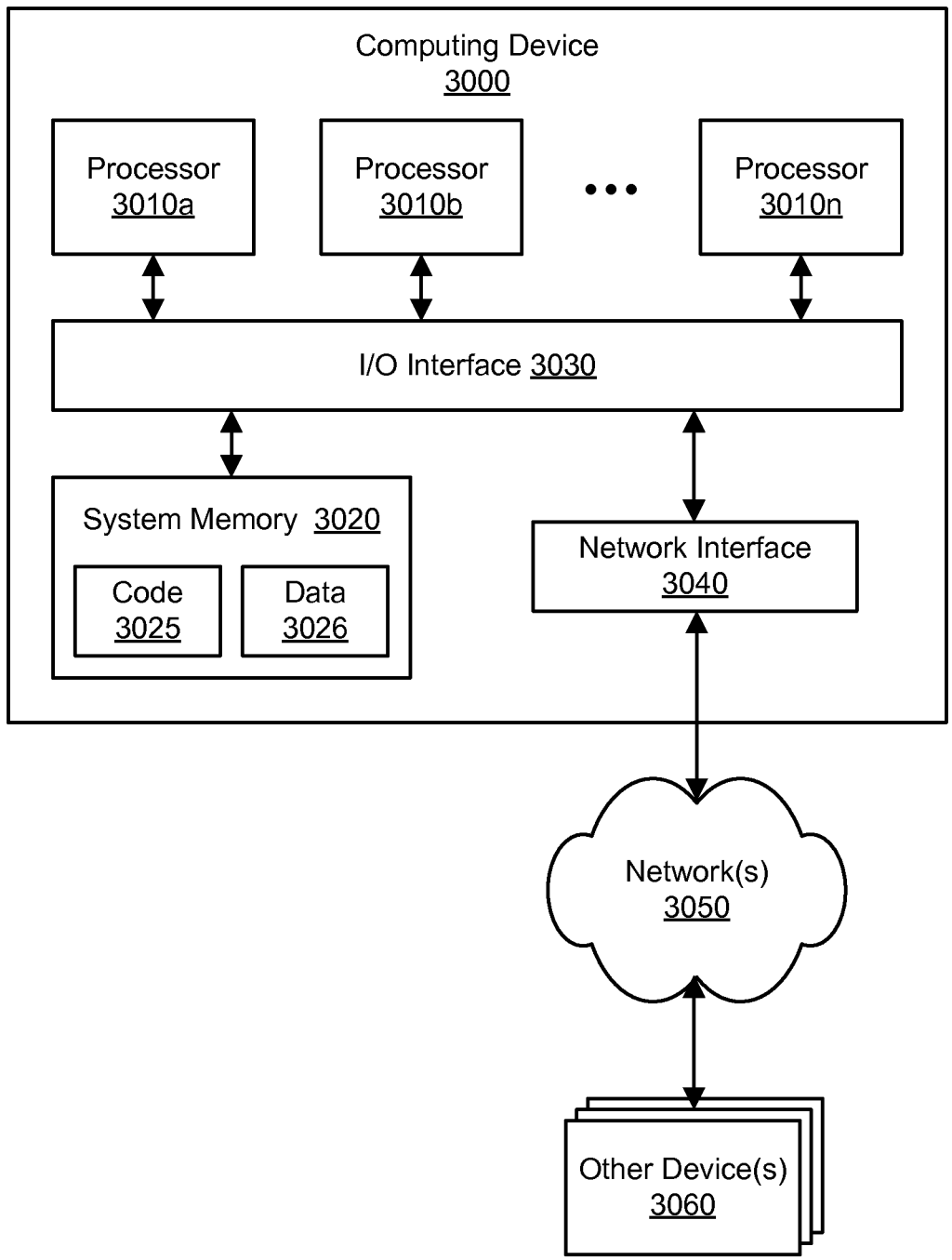
FIG. 8 illustrates an example of a computing device that may be used in some embodiments.

The storage composition system 100 may be implemented using one or more computing devices, any of which may be implemented by the example computing device 3000 illustrated in FIG. 8. In various embodiments, portions of the functionality of the storage composition system 100 may be provided by the same computing device or by any suitable number of different computing devices. If any of the components of the storage composition system 100 are implemented using different computing devices, then the components and their respective computing devices may be communicatively coupled, e.g., via a network. Each of the illustrated components may represent any combination of software and hardware usable to perform their respective functions. It is contemplated that the storage composition system 100 may include additional components not shown, fewer components than shown, or different combinations, configurations, or quantities of the components shown.

Embodiments of various systems and methods for implementing techniques for storage composition are generally described herein in the context of a storage composition system 100 that provides to clients, via an intermediate network such as the Internet, virtualized resources (e.g., virtualized computing and storage resources) and/or computing services implemented on a provider network. In at least some embodiments, at least some of the resources provided to clients of the storage composition system 100 via the provider network may be virtualized computing resources implemented on multi-tenant hardware that is shared with other client(s) and/or on hardware dedicated to the particular client. The virtualized computing resources may include storage resources and computational resources. Each virtualized computing resource may be referred to as a resource instance. Resource instances may, for example, be rented or leased to clients of the storage composition system 100. For example, clients of the storage composition system 100 may access one or more services of the provider network via application programming interfaces (APIs) to the services to obtain and configure resource instances and to establish and manage virtual network configurations that include the resource instances. In some embodiments, the resource instances may, for example, be implemented according to hardware virtualization technology that enables multiple operating systems to run concurrently on a host computer, i.e., as virtual machines (VMs) on the hosts. A hypervisor, or virtual machine monitor (VMM), on a host may present the VMs on the host with a virtual platform and monitors the execution of the VMs. Each VM may be provided with one or more private IP addresses; the VMM on a host may be aware of the private IP addresses of the VMs on the host.

Figure 2:
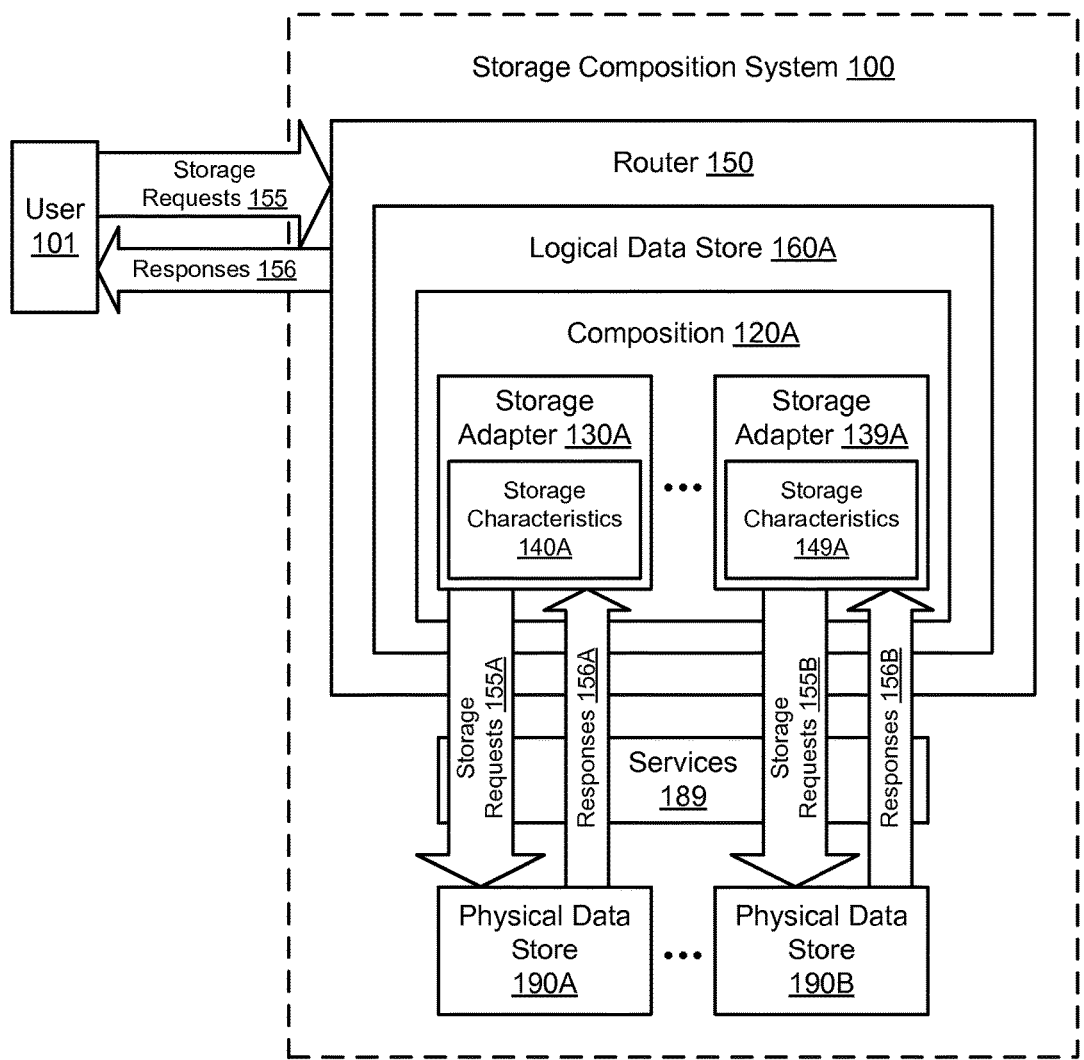
FIG. 2 illustrates further aspects of the example system environment for augmenting storage functionality using composition, including request routing using storage adapters, according to some embodiments.

FIG. 2 illustrates further aspects of the example system environment for augmenting storage functionality using composition, including request routing using storage adapters, according to some embodiments. As discussed above, the logical data store 160A may be created based on a selected composition 120A. As shown in FIG. 2, the composition 120A within the logical data store 160A may represent an instantiation of a particular composition blueprint. By using the composition 120A as a foundation, the logical data store 160A may include storage adapters 130A through 139A that communicate with respective physical data stores 190A and 190B having different storage characteristics.

One or more users, such as user 101, may interact with the logical data store 160A by generating suitable storage requests 155 intended for the logical data store. The user(s) that generate the request(s) 155 may be the same user or different users than the user whose storage requirements 105 were used to create the logical data store 160A. The logical data store 160A may represent an organizational scheme for data such as one or more tables, scopes, or other data structures. The data elements in the logical data store 160A may be stored in suitable portions of the physical data storage 190A-190B as accessed using the respective adapters 130A-139A. The storage requests 155 may include read requests for particular elements of data in the logical data store 160A, write requests for particular elements of data in the logical data store, delete requests for particular elements of data in the logical data store, configuration requests to reconfigure aspects of the logical data store, and/or other requests suitable for accessing or managing data through the logical data store. The storage requests 155 may be received by the storage composition system 100 using any suitable interface and over any suitable network(s) or interconnect(s). The organization or configuration of the logical data store 160A and/or of data in the underlying physical data stores 190A may vary for different geographical regions of the storage composition system 100.

In one embodiment, the storage composition system 100 may include a router fleet that includes a router 150 and any suitable number of additional routers. The router 150 may implement the logical data store 160A and may include program code for the storage adapters 130A-139A. The storage requests 155 may include metadata indicating the target logical data store 160A and may, if necessary, be routed to the particular router 150 that implements the logical data store. The use of the physical data stores 190A and 190B and the storage services 189 may be transparent to the user, such that the user may be unaware of where and how the underlying data is stored and which of the physical data stores and/or storage services is used to satisfy a particular storage request. The composition 120A implemented by the router may include additional logic for managing data, e.g., logic for deciding which of the underlying physical data stores 190A or 190B and/or storage services to access to satisfy a particular storage request. As shown in FIG. 2, the router 150 may implement the additional logic to route some of the storage requests 155A to the physical data store 190A and others of the storage requests 155B to the physical data store 190B, e.g., via the respective services associated with those physical data stores. For example, in comparison to each other, the physical data store 190A may be associated with a storage service that provides faster but more expensive storage, while the physical data store 190B may be associated with a storage service that provides slower but less expensive storage. The storage requests 155A may represent requests associated with data in the fast, expensive physical storage 190A, and the storage requests 155B may represent requests associated with data in the slow, cheap physical storage 190B.

After the requests 155A and 155B are processed by the services associated with the physical data stores 190A and 190B, responses 156A and 156B (e.g. data retrieved for read requests and/or acknowledgements of successful data writes) may be returned to the router 150 and then sent to the requesting user 101. As received by the user 101, the responses 156 may not indicate which of the underlying physical data stores 190A or 190B and/or storage services 189 was used to satisfy the request. In this manner, the user may interact only with the logical data store 160A, and the identity and configuration of the physical data stores 190A and 190B and storage services 189 may be hidden from the user.

In one embodiment, access to the logical storage device is enabled using a particular application programming interface (API) for the storage requests 155. The particular interface may represent a noSQL interface with commands for PUT( ), GET( ), and DELETE( ). The storage adapters may include an adapter for native storage in a noSQL database that uses the particular interface; such a native adapter that may be fully aware of partitioning details in a database cluster, may have a connection to every replica in a cluster, may monitor the health of each replica, and may use this information to translate and route requests. The storage adapters may also include an adapter for a cloud-based database service (such as Amazon DynamoDB) that maps the native interface to the interface for the cloud-based database service, other adapters that perform lightweight transformation of requests to storage services that implement the particular interface, and adapters for various other storage services having various features and attributes. In general, storage adapters may perform any suitable translation or transformation of data from the logical data store 160A to the physical data storage 190 and back again.

Compositions may enable various combinations of features, functionality, and attributes associated with the storage adapters for various storage solutions. For example, one type of composition may enable "fallback" storage with one storage service that provides faster but more expensive storage and another storage service that provides slower but less expensive storage. Fallback storage may provide tiered storage using a primary data store for "hot" or more recently accessed data and a secondary data store for "cold" or less recently accessed data. The composition for fallback storage may handle the complexities of managing reads and writes between two data stores. For example, when a user issues a read request for a fallback table in the logical data store, the router may first attempt to read from the primary (hot) store and fall back to the secondary (cold) data store if there is no record in the primary store. When a user writes a record that exists only in the secondary store, the router first rehydrates the record into the primary scope data store and then applies the write to the primary store. A workflow may be responsible for aging out data from the primary store to the secondary store. This fallback workflow may read from an archive log, build a compact representation of the table (e.g., as a read-only database) in the secondary store, and remove the record from the primary store.

As another example, a composition may enable large payload support using two different storage solutions. A primary storage service may store relatively small payloads as records, e.g., in a noSQL database. For payloads that are beyond a threshold size for the primary storage, the data may be stored in a less expensive and secondary storage service, e.g., in buckets using Amazon Simple Storage Service (S3). After such a large payload is stored in the secondary storage, a link to the storage location may be added to the primary storage. As a further example, a composition may provide support deduplication and auditing using two or more data stores including a deduplication data store; a manifest of data modifications may be maintained to permit these features. As yet another example, a composition may provide support for transaction storage on top of noSQL storage using two or more data stores that maintain a transaction scope.

Figure 3:
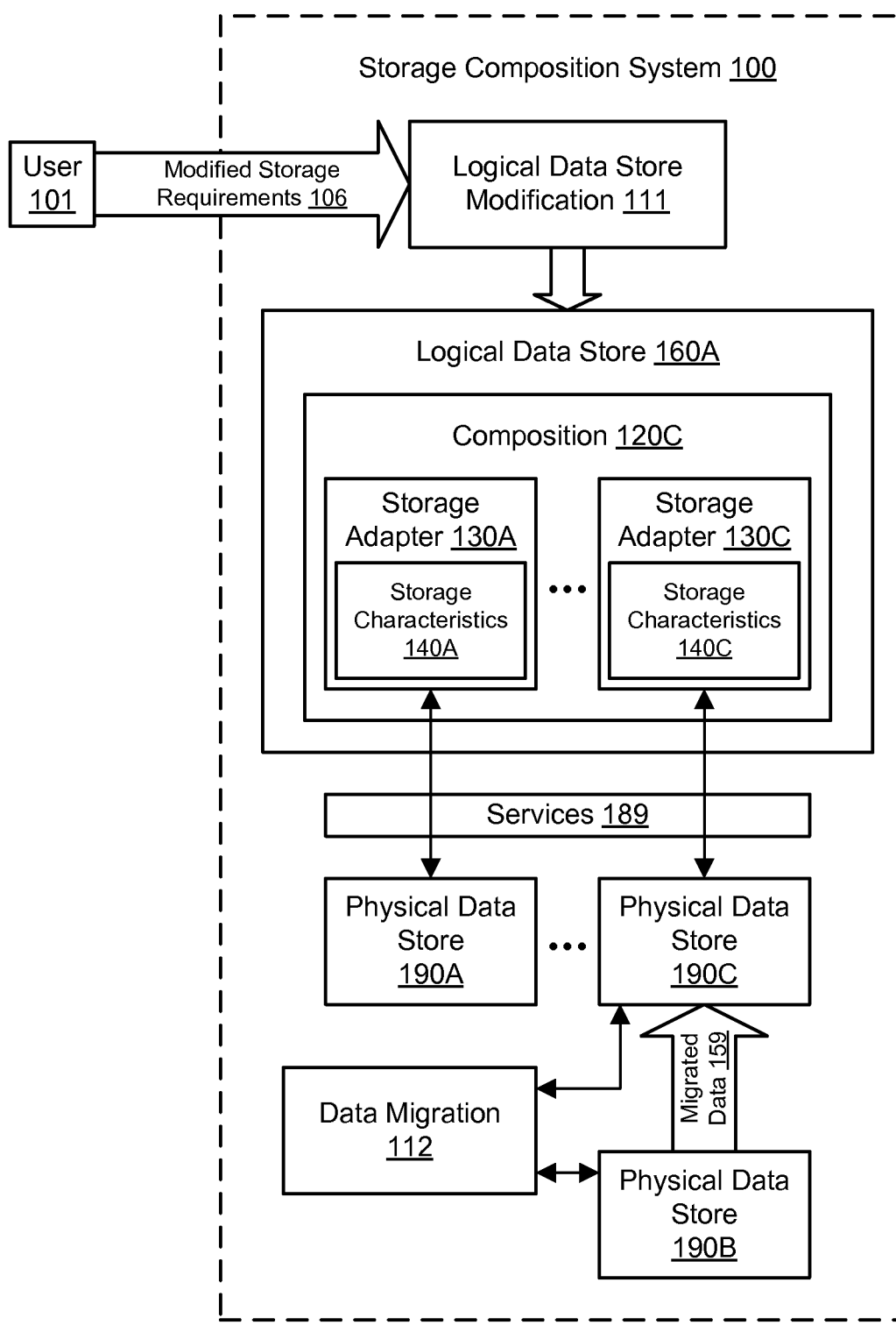
FIG. 3 illustrates further aspects of the example system environment for augmenting storage functionality using composition, including the modification of a composition underlying a logical data store in response to the modification of storage requirements, according to some embodiments.

FIG. 3 illustrates further aspects of the example system environment for augmenting storage functionality using composition, including the modification of a composition underlying a logical data store in response to the modification of storage requirements, according to some embodiments. In one embodiment, the storage composition system 100 may include a functionality 111 for logical data store modification. Using the logical data store modification functionality 111, the storage composition system 100 may reconfigure or modify a logical data store 160A that was previously created for a particular user. In one embodiment, the logical data store modification functionality 111 may represent a variation of the logical data store creation functionality 110. Again, the particular user may be an individual or entity (such as a business organization) that is a client of the storage composition system 100. The user 101 may supply a specification of modified storage requirements 106 to the storage composition system using any suitable interface, such as an application programming interface (API) or user interface. The modified storage requirements 106 may represent requested minimums, maximums, values, ranges of values, or relative priorities for storage characteristics such as latency, throughput, security, consistency, reliability, cost, and other suitable characteristics. In general, it is contemplated that the modified storage requirements 106 may include any suitable functional requirements and/or performance requirements. The modified storage requirements 106 may differ from the original storage requirements 105 in one or more respects.

Based on the specification of modified storage requirements 106, the logical data store modification functionality 111 may select a different composition blueprint 120C as a new basis for the logical data store 160A. In one embodiment, the new composition 120C may include or exclude any of the storage adapters from the original composition 120A. As shown in the example of FIG. 3, the new composition 120C may include the same storage adapter 130A (associated with storage characteristics 140A) for the physical data store 190A and also a different storage adapter 130C (associated with storage characteristics 140C) for another physical data store 190C. The composition 120C may be selected for the modified logical data store 160A based on a match or other correspondence between the storage characteristics 140A and 140C and the modified storage requirements 106. The newly selected composition 120C may match the modified storage requirements 106 more closely than the previously selected composition 120A.

The modification of the logical data store 160A may be transparent to the user 101, such that the user may be unaware that the underlying physical data store has changed. In one embodiment, the user 101 may continue to interact with the logical data store 160A without an interruption in service. Using a data migration functionality 112, data 159 may be transparently migrated from the physical data store 190B to the physical data store 190C after the logical data store 160A has been modified. In one embodiment, the data 159 may be migrated while the user 101 continues to have read and/or write access to the logical data store 160A, and suitable logic may be used to ensure the consistency of the underlying data storage during the migration process. The data migration functionality 112 may implement hosted online data migration with respect to the source data store 190B and the target data store 190C.

In one embodiment, the modified storage requirements 106 may be generated not by the user 101 but by programmatic analysis of storage use. The analysis may monitor traffic patterns and/or usage changes. For example, if the analysis determines that a particular storage solution that represents slower and less expensive storage is being accessed with greater frequency than anticipated, then the composition may be modified to replace that storage solution, and the data in that storage solution may be automatically migrated to a faster and more expensive storage solution.

Figure 4:
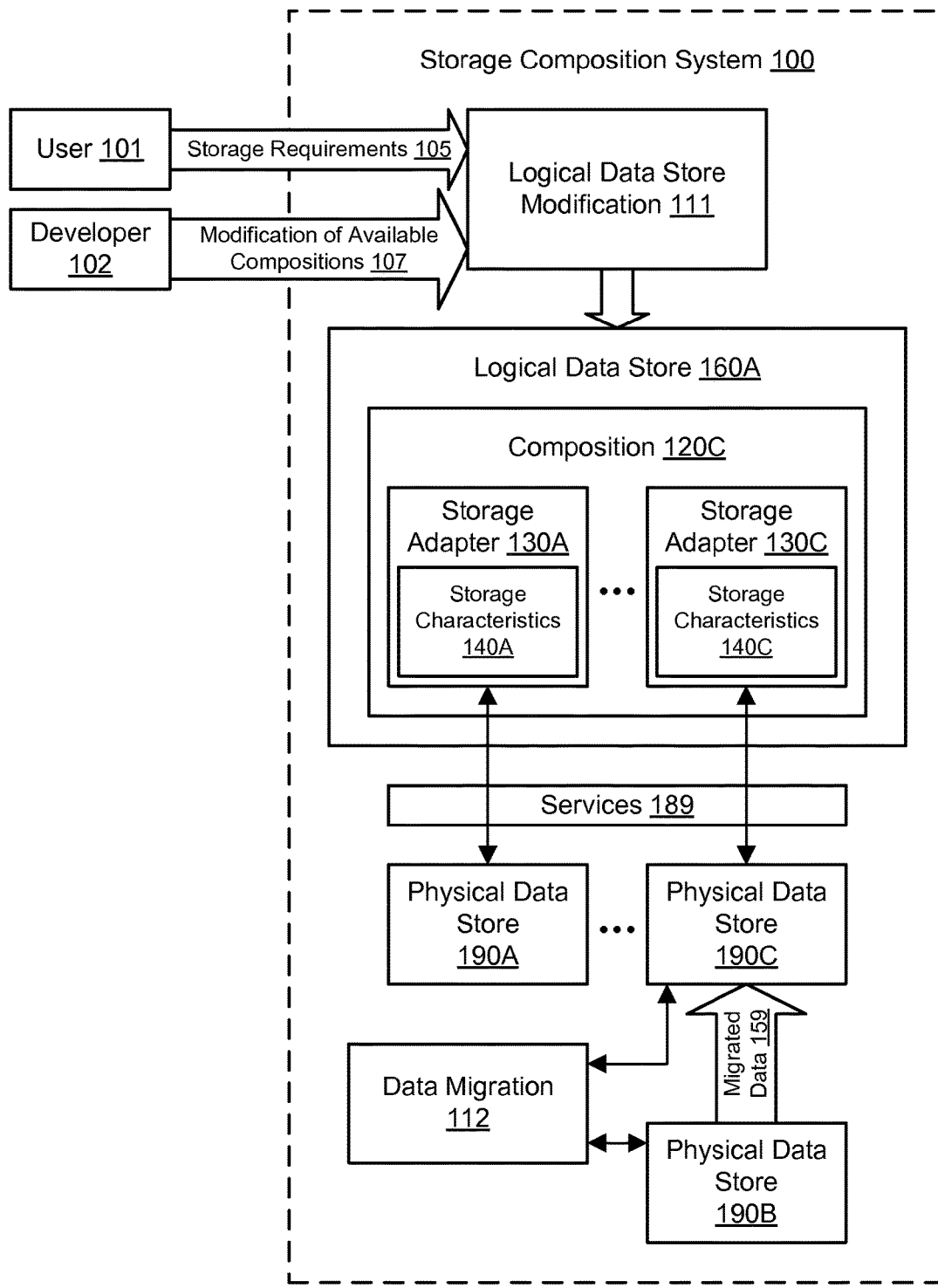
FIG. 4 illustrates further aspects of the example system environment for augmenting storage functionality using composition, including the modification of a composition underlying a logical data store in response to the modification of available storage adapters, according to some embodiments.

FIG. 4 illustrates further aspects of the example system environment for augmenting storage functionality using composition, including the modification of a composition underlying a logical data store in response to the modification of available storage adapters, according to some embodiments. Using the logical data store modification functionality 111, the storage composition system 100 may reconfigure or modify a logical data store 160A that was previously created for a particular user. In one embodiment, the logical data store modification functionality 111 may modify the logical data store 160A based on the originally submitted storage requirements when the set of available compositions 120 has changed. The set of available compositions 120 may be modified to include one or more new compositions, exclude one or more previously available compositions, or change the storage characteristics associated with one or more previously available compositions. As shown in FIG. 4, a specification 107 of the modification of the available compositions may be provided to the logical data store modification functionality 111 by a developer 102. The specification 107 may indicate one or more new or modified compositions and the associated storage characteristics.

The developer 102 may represent an administrator of the storage composition system 100 or an entity approved to modify the set of available compositions, e.g., a third party approved to submit new compositions to a composition marketplace. The composition marketplace may list the compositions 120A-120N available to consumers who wish to select and use compositions. In one embodiment, the composition marketplace may also list the available storage adapters (e.g., adapters 130A-139A, 130B-139B, and 130N-139N) to consumers who wish to select and use storage adapters, e.g., in their own compositions. The marketplace may be presented to developers within a business enterprise as well as developers representing external organizations. The marketplace may include compositions and/or storage adapters submitted by external entities, and the external entities may be responsible for administration and support when their compositions and/or storage adapters are selected and used by others. The marketplace may permit any suitable business arrangements for the licensing of compositions and/or storage adapters by consumers.

Based on the storage requirements 106 and the storage characteristics associated with the current set of available compositions, the logical data store modification functionality 111 may select a different composition blueprint 120C as a new basis for the logical data store 160A. In one embodiment, the new composition 120C may include or exclude any of the storage adapters from the original composition 120A. As shown in the example of FIG. 4, the new composition 120C may include the same storage adapter 130A (associated with storage characteristics 140A) for the physical data store 190A and also a different storage adapter 130C (associated with storage characteristics 140C) for another physical data store 190C. The composition 120C may be selected for the modified logical data store 160A based on a match or other correspondence between the storage characteristics 140A and 140C and the storage requirements 105. The newly selected composition 120C may match the storage requirements 105 more closely than the previously selected composition 120A.

The modification of the logical data store 160A may be transparent to the user 101, such that the user may be unaware that the underlying physical data store has changed. In one embodiment, the user 101 may continue to interact with the logical data store 160A without an interruption in service. Using a data migration functionality 112, data 159 may be transparently migrated from the physical data store 190B to the physical data store 190C after the logical data store 160A has been modified. In one embodiment, the data 159 may be migrated while the user 101 continues to have read and/or write access to the logical data store 160A, and suitable logic may be used to ensure the consistency of the underlying data storage during the migration process. The data migration functionality 112 may implement hosted online data migration with respect to the source data store 190B and the target data store 190C.

Figure 5:
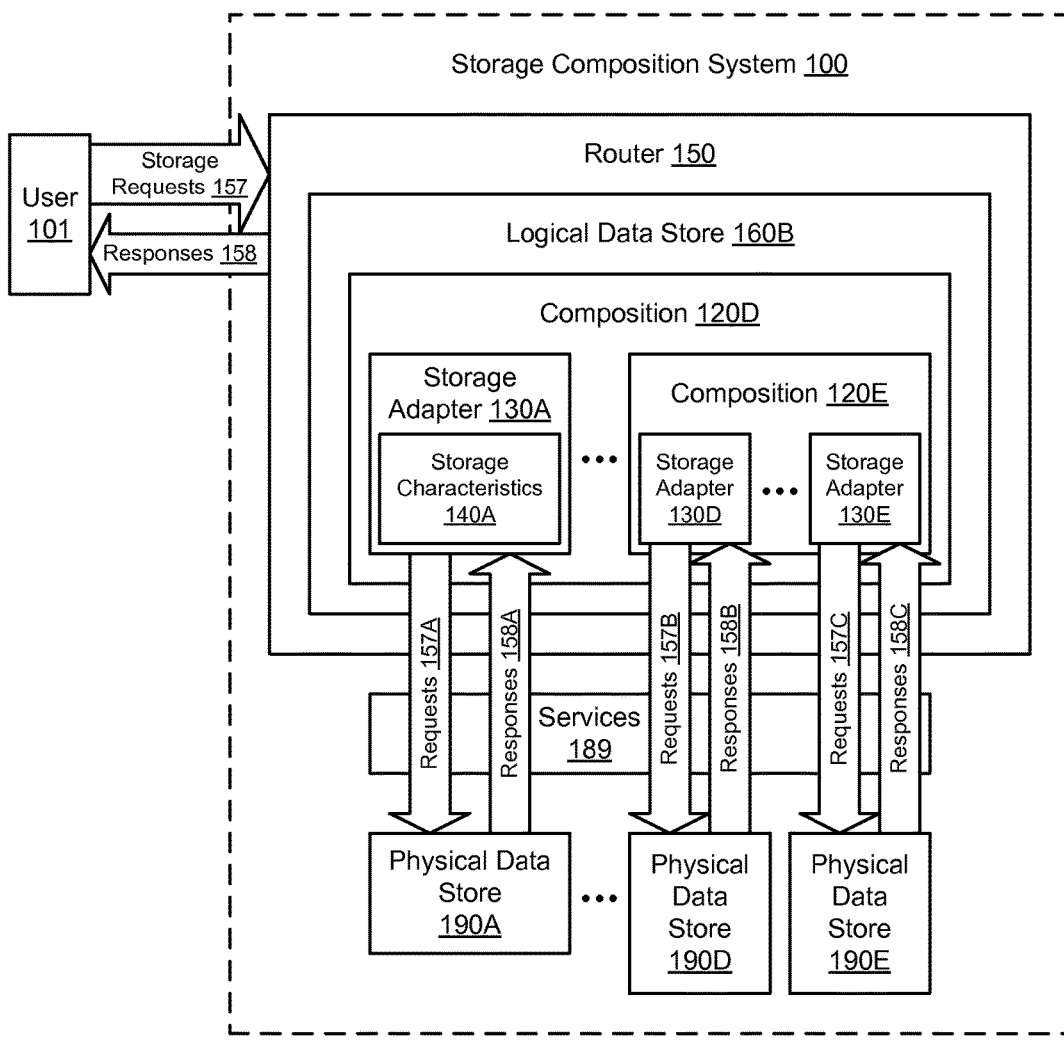
FIG. 5 illustrates further aspects of the example system environment for augmenting storage functionality using composition, including a composition that includes another composition, according to some embodiments.

FIG. 5 illustrates further aspects of the example system environment for augmenting storage functionality using composition, including a composition that includes another composition, according to some embodiments. In one embodiment, any composition may include one or more other compositions. For example, a particular composition may include a storage adapter and a composition, and another particular composition may include two or more compositions. Using the techniques discussed above, a logical data store 160B may be created for a particular user based on a specification of storage requirements. As shown in the example of FIG. 5, the logical data store 160B may be created based on a composition 120D that includes one or more storage adapters (such as adapter 130A) and one or more other compositions (such as composition 120E). In one embodiment, compositions and storage adapters may share a common interface to facilitate the nesting of both compositions and storage adapters within compositions. The composition 120D within the logical data store 160B may represent an instantiation of a particular composition blueprint. By using composition 120D as a foundation, the logical data store 160B may include storage adapter 130A that communicates with physical data store 190A and may further include composition 120E that includes storage adapters 130D through 130E. The storage adapters may enable communication with respective physical data stores 190D and 190E having different storage characteristics. The composition 120D may be configured with the composition 120E by an administrator of the storage composition system 100 or by any other entity approved to supply compositions to the storage composition system. The composition 120D may be selected based on a match or other correspondence between the storage requirements submitted by the user and the storage characteristics for the various storage adapters 130A, 130D, and 130E in the composition 120D.

One or more users, such as user 101, may interact with the logical data store 160B by generating suitable storage requests 157 intended for the logical data store. The user(s) that generate the request(s) 157 may be the same user or different users than the user whose storage requirements were used to create the logical data store 160B. The logical data store 160B may represent an organizational scheme for data such as one or more tables, scopes, or other data structures. The data elements in the logical data store 160B may be stored in suitable portions of the physical data storage 190A, 190D, and 190E as accessed using the respective adapters 130A, 130D, and 130E. The storage requests 157 may include read requests for particular elements of data in the logical data store 160B, write requests for particular elements of data in the logical data store, configuration requests to reconfigure aspects of the logical data store, and/or other requests suitable for accessing or managing data through the logical data store. The storage requests 157 may be received by the storage composition system 100 using any suitable interface and over any suitable network(s) or interconnect(s).

In one embodiment, the storage composition system 100 may include a router fleet that includes a router 150 and any suitable number of additional routers. The router 150 may implement the logical data store 160B and may include program code for the storage adapters 130A, 130D, and 130E. The storage requests 157 may include metadata indicating the target logical data store 160B and may, if necessary, be routed to the particular router 150 that implements the logical data store. The use of the physical data stores 190A, 190D, and 190E may be transparent to the user, such that the user may be unaware of where and how the underlying data is stored and which of the physical data stores is used to satisfy a particular storage request. The compositions 120D and/or 120E may include additional logic for managing data, e.g., logic for deciding which of the underlying physical data stores 190A, 190D, and 190E to access to satisfy a particular storage request. As shown in FIG. 5, the router 150 may implement the additional logic to route some of the storage requests 157A to the physical data store 190A, others of the storage requests 157B to the physical data store 190D, and yet others of the storage requests 157C to the physical data store 190E, e.g., via the associated services 189.

After the requests 157A-157C are processed by the services associated with the physical data stores 190A, 190D, and 190E, responses 158A, 158B, and 158C (e.g. data retrieved for read requests and/or acknowledgements of successful data writes) may be returned to the router 150 and then sent to the requesting user 101. As received by the user 101, the responses 158 may not indicate which of the underlying physical data stores 190A, 190D, and 190E and/or services 189 was used to satisfy the request. In this manner, the user 101 may interact only with the logical data store 160B, and the identity and configuration of the physical data stores 190A, 190D, and 190E and services 189 may be hidden from the user.

Figure 6:
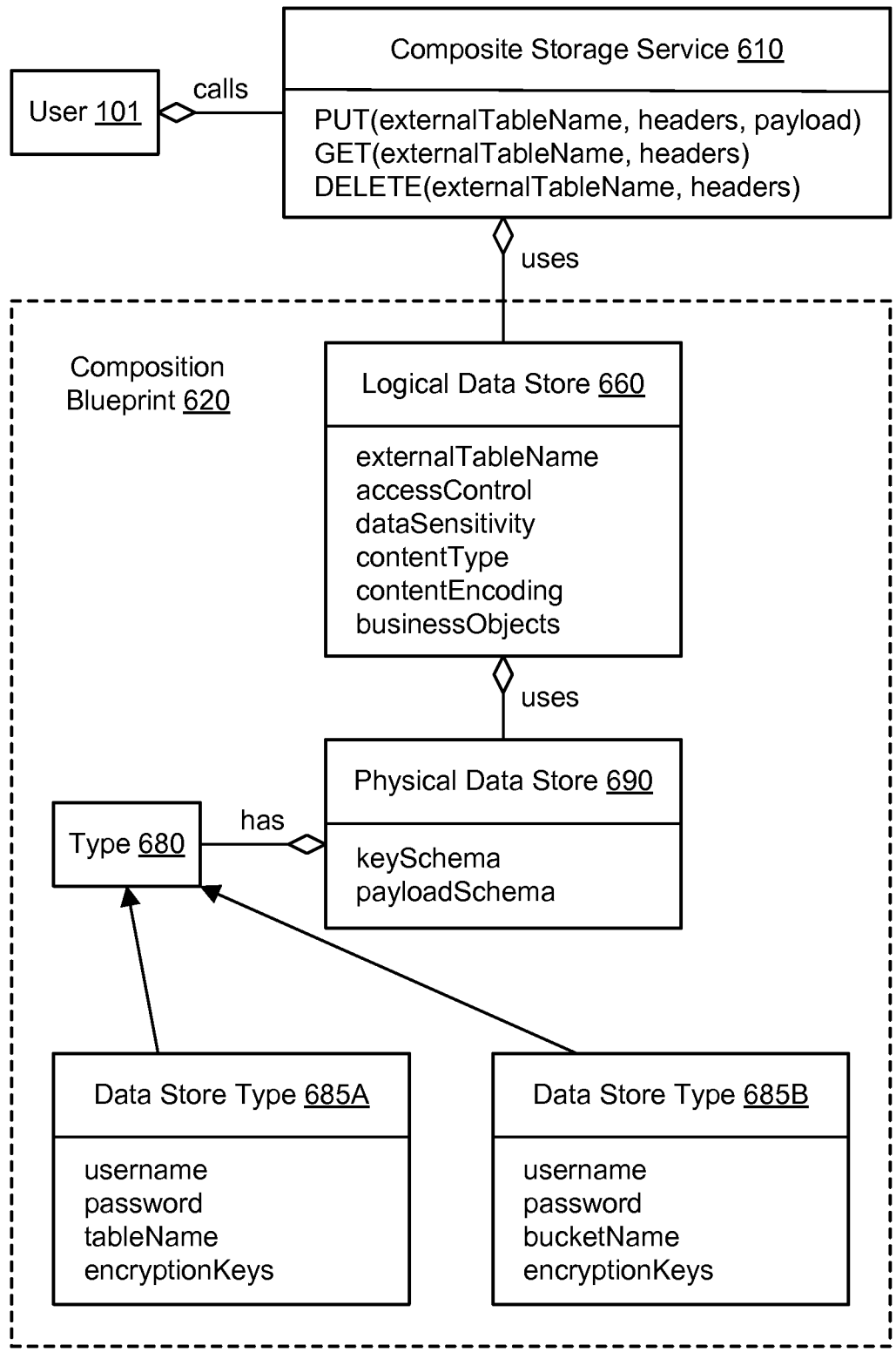
FIG. 6 is a class diagram illustrating an example of a composition blueprint for augmenting storage functionality using composition, according to some embodiments.

FIG. 6 is a class diagram illustrating an example of a composition blueprint 620 for augmenting storage functionality using composition, according to some embodiments. Elements of the composition blueprint 620 may represent classes that are instantiated to produce an instance of a composition within the router 150. A user 101 may call a composite storage service 610, such as to issue requests for functions such as PUT( ), GET( ), or DELETE( ). In one embodiment, the PUT( ) function may accept inputs such as externalTableName, headers, and a payload; the GET( ) function may accept inputs such as externalTableName and headers; and the DELETE( ) function may accept inputs such as externalTableName and headers. In one embodiment, the PUT( ), GET( ), and DELETE( ) functions may also return suitable outputs such as an indication of success or failure of the requested operation. The composite storage service 610 may use a logical data store 660 within the blueprint 620 to satisfy the requests. The class for the logical data store 660 may include user-visible attributes such as externalTableName representing the name of the table or scope to which the user 101 has access. The class for the logical data store 660 may include additional user-visible attributes such as accessControl metadata (representing the user(s) who can access the table or scope), dataSensitivity metadata (representing sensitivity of the table or scope), contentType metadata (indicating types of the data), contentEncoding metadata (indicating, for example, whether the data is compressed), and businessObjects metadata (indicating, for example, that the database includes columnar data).

The class for the logical data store 660 may use a class for the physical data store 690. The class for the physical data store 690 may include customer-hidden attributes such as a keySchema (indicating the primary keys) and a payloadSchema (indicating a format and/or type for the payloads associated with keys). As represented in the class for the physical data store 690, an index may have the same data as the original record but with a different key structure. The class for the physical data store 690 may have one or more types 680. Examines of types 680 are a class for a first data store type 685A and a class for a second data store type 685B. For example, the class for the first data store type 685A may represent a faster and more expensive storage solution that stores data elements in tables, and the class for the second data store type 685B may represent a slower and less expensive storage solution that stores data in larger buckets. The class for the first data store type 685A may include attributes such as a username and password for accessing the physical data store, a tableName for the underlying storage in the physical data store, and encryptionKeys for the physical data store. Similarly, the class for the second data store type 685B may include attributes such as a username and password for accessing the physical data store, a bucketName for the underlying storage in the physical data store, and encryptionKeys for the physical data store.

Figure 7:
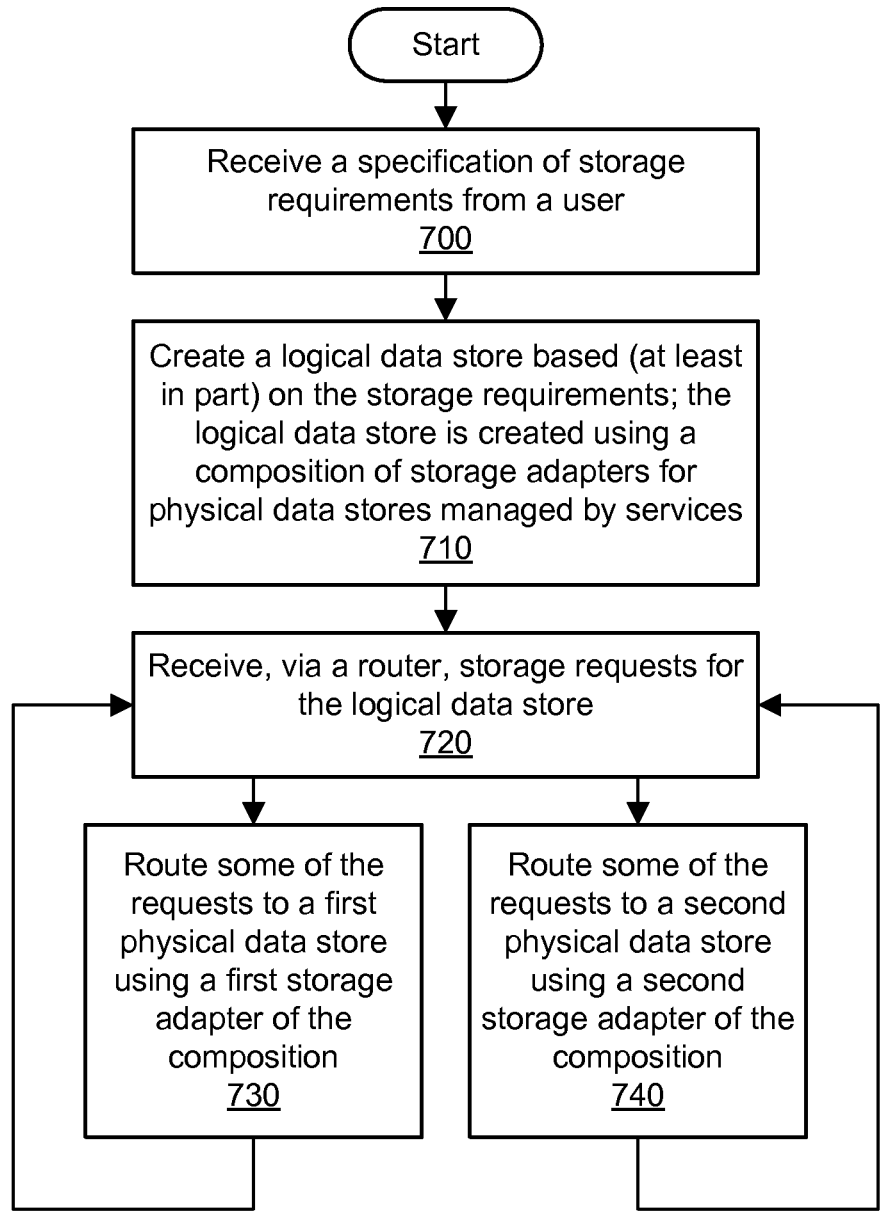
FIG. 7 is a flowchart illustrating a method for augmenting storage functionality using composition, according to some embodiments.

FIG. 7 is a flowchart illustrating a method for augmenting storage functionality using composition, according to some embodiments. As shown in 700, a specification of storage requirements may be received from a user. The user may supply a specification of storage requirements to a storage composition system using any suitable interface, such as an application programming interface (API) or user interface. The storage requirements may represent requested minimums, maximums, values, ranges of values, or relative priorities for storage characteristics such as latency, throughput, security, consistency, reliability, cost, and other suitable characteristics. In general, it is contemplated that the storage requirements may include any suitable functional requirements and/or performance requirements.

The submission of the storage requirements may initiate a workflow to create a logical data store. As shown in 710, a logical data store may be created based (at least in part) on the storage requirements. The logical data store may be created using a composition of storage adapters for physical data stores, such as a first storage adapter for a first physical data store and a second storage adapter for a second physical data store. By including a combination of storage adapters, the composition may combine the different storage characteristics of a plurality of physical data stores. The logical data store may be created for the user based on a selected composition whose storage characteristics meet or otherwise have a correspondence with the storage requirements. Any suitable heuristics may be used to select one of the compositions for the user.

As shown in 720, storage requests for the logical data store may be received via a router. The storage requests may include read requests for particular elements of data in the logical data store, write requests for particular elements of data in the logical data store, delete requests for particular elements of data in the logical data store, configuration requests to reconfigure aspects of the logical data store, and/or other requests suitable for accessing or managing data through the logical data store. The router may implement the logical data store and may include program code for the storage adapters.

The use of the first and second physical data stores may be transparent to the user, such that the user may be unaware of where and how the underlying data is stored and which of the physical data stores is used to satisfy a particular storage request. The selected composition implemented by the router may include additional logic for managing data, e.g., logic for deciding which of the underlying physical data stores to access to satisfy a particular storage request. As shown in 730, some of the storage requests may be routed to the first physical data store using the first storage adapter. As shown in 740, some of the storage requests may be routed to the second physical data store using the second storage adapter. Requests may continue to be received and routed in this manner until the logical data store is suspended, deleted, or modified to be based on different underlying physical storage solutions.

Illustrative Computer System

In at least some embodiments, a computer system that implements a portion or all of one or more of the technologies described herein may include a general-purpose computer system that includes or is configured to access one or more computer-readable media. FIG. 8 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or different types of computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. When used in the claims, the term "or" is used as an inclusive or and not as an exclusive or. For example, the phrase "at least one of x, y, or z" means any one of x, y, and z, as well as any combination thereof.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    a plurality of computing devices configured to implement a storage composition system, wherein the storage composition system is configured to:
        receive a specification of storage requirements from a user;
        determine a composition for a logical data store based at least in part on the storage requirements received from the user, wherein the composition comprises a plurality of storage adapters for a plurality of physical data stores including a first storage adapter for a first physical data store and a second storage adapter for a second physical data store, wherein the first storage adapter is associated with first storage characteristics, wherein the second storage adapter is associated with second storage characteristics differing from the first storage characteristics, and wherein the composition is determined for the logical data store based at least in part on a match or correspondence between the storage requirements and the first and second storage characteristics; and
        create the logical data store based on the composition; and
    a router configured to:
        receive a plurality of storage requests for the logical data store;
        route individual ones of the plurality of storage requests to the first physical data store using the first storage adapter; and
        route individual ones of the plurality of storage requests to the second physical data store using the second storage adapter.

2. The system as recited in claim 1:
    wherein the storage composition system is configured to:
        receive a specification of modified storage requirements;

determine a modified composition for the logical data store based at least in part on the modified storage requirements, wherein the second storage adapter is replaced by a third storage adapter for a third physical data store in the modified composition; and migrate data owned by the user from the second physical data store to the third physical data store; and wherein the router is configured to:

route individual ones of the plurality of storage requests to the third physical data store using the third storage adapter.

3. The system as recited in claim 1, wherein a set of available storage adapters comprises the first storage adapter and the second storage adapter when the logical data store is created, wherein the set of available storage adapters is modified to include a third storage adapter for a third physical data store after the logical data store is created, wherein the storage composition system is configured to:

determine a modified composition for the logical data store based at least in part on the storage requirements, wherein the second storage adapter is replaced by the third storage adapter in the modified composition; and migrate data owned by the user from the second physical data store to the third physical data store; and wherein the router is configured to:

route individual ones of the plurality of storage requests to the third physical data store using the third storage adapter.

4. The system as recited in claim 1, wherein the composition comprises an additional composition of an additional plurality of storage adapters.

5. A computer-implemented method, comprising:

performing, by a storage composition system implemented on one or more computing devices:

determining a composition for a logical data store based at least in part on storage requirements specified by a user comprising a plurality of storage adapters for a plurality of physical data stores including a first storage adapter for a first physical data store and a second storage adapter for a second physical data store;

creating the logical data store based on the composition;

receiving a plurality of storage requests for the logical data store;

routing individual ones of the plurality of storage requests to the first physical data store using the first storage adapter; and routing individual ones of the plurality of storage requests to the second physical data store using the second storage adapter.

6. The computer-implemented method as recited in claim 5, wherein the first storage adapter and the second storage adapter are associated with different storage characteristics, and wherein the composition is determined for the logical data store based at least in part on a match or correspondence between the storage requirements and the different storage characteristics.

7. The computer-implemented method as recited in claim 5, further comprising:

performing, by the storage composition system:

determining a modified composition for the logical data store based at least in part on modified storage requirements, wherein the second storage adapter is replaced by a third storage adapter for a third physical data store in the modified composition;

migrating data from the second physical data store to the third physical data store; and routing individual ones of the plurality of storage requests to the third physical data store using the third storage adapter.

8. The computer-implemented method as recited in claim 5, wherein a set of available storage adapters comprises the first storage adapter and the second storage adapter when the logical data store is created, wherein the set of available storage adapters is modified to include a third storage adapter for a third physical data store after the logical data store is created, and wherein the method further comprises performing, by the storage composition system:

determining a modified composition for the logical data store based at least in part on the storage requirements specified by the user, wherein the second storage adapter is replaced by the third storage adapter in the modified composition;

migrating data from the second physical data store to the third physical data store; and routing individual ones of the plurality of storage requests to the third physical data store using the third storage adapter.

9. The computer-implemented method as recited in claim 5, wherein the composition comprises an additional composition of an additional plurality of storage adapters, and wherein the composition, the plurality of storage adapters, the additional composition, and the additional plurality of storage adapters share a common interface.

10. The computer-implemented method as recited in claim 5, further comprising:

performing, by the storage composition system:

receiving an indication of data not found for a read request of the plurality of storage requests routed to the first physical data store; and routing the read request to the second physical data store;

wherein individual ones of the plurality of storage requests routed to the first physical data store are storage requests for more recently accessed data, and wherein the individual ones of the plurality of storage requests routed to the second physical data store are storage requests for less recently accessed data.

11. The computer-implemented method as recited in claim 5, further comprising:

creating, by the storage composition system, a link on the first physical data store for a data item created on the second physical data store;

wherein the first physical data store is configured to store data items up to a threshold size, and wherein the second physical data store is configured to store data items larger than the threshold size.

12. The computer-implemented method as recited in claim 5, further comprising:

causing, by the storage composition system, at least one of the plurality of physical data stores to implement deduplication and auditing.

13. The computer-implemented method as recited in claim 5, wherein the logical data store comprises a table, wherein elements of data in the table are stored using the first physical data store and the second physical data store, and wherein the plurality of storage requests comprise read requests, write requests, or read and write requests for the elements of data in the table.

14. A non-transitory computer-readable storage medium storing program instructions computer-executable to perform:

determining a composition for a logical storage device based at least in part on storage requirements specified by a user, wherein the composition comprises a plurality of storage adapters for a plurality of physical storage devices including a first storage adapter for a first physical storage device and a second storage adapter for a second physical storage device, wherein the first storage adapter and the second storage adapter are associated with different storage characteristics, and wherein the composition is determined for the logical storage device based at least in part on a match or correspondence between the storage requirements and the different storage characteristics;

creating the logical data store based on the composition;

receiving a plurality of storage requests for the logical storage device;

routing individual ones of the plurality of storage requests to the first physical storage device using the first storage adapter; and routing individual ones of the plurality of storage requests to the second physical storage device using the second storage adapter.

15. The non-transitory computer-readable storage medium as recited in claim 14, wherein the program instructions are further computer-executable to perform:

determining a modified composition for the logical storage device based at least in part on modified storage requirements specified by the user, wherein the first storage adapter or the second storage adapter is replaced by a third storage adapter for a third physical storage device in the modified composition; and routing individual ones of the plurality of storage requests to the third physical storage device using the third storage adapter.

16. The non-transitory computer-readable storage medium as recited in claim 14, wherein a set of available storage adapters comprises the first storage adapter and the second storage adapter when the logical storage device is determined, wherein the set of available storage adapters is modified to include a third storage adapter for a third physical storage device after the logical storage device is determined, and wherein the program instructions are further computer-executable to perform:

determining a modified composition for the logical storage device based at least in part on the storage requirements specified by the user, wherein the first storage adapter or the second storage adapter is replaced by the third storage adapter in the modified composition; and routing individual ones of the plurality of storage requests to the third physical storage device using the third storage adapter.

17. The non-transitory computer-readable storage medium as recited in claim 14, wherein the composition comprises an additional composition of an additional plurality of storage adapters, and wherein the composition, the plurality of storage adapters, the additional composition, and the additional plurality of storage adapters share a common interface.

18. The non-transitory computer-readable storage medium as recited in claim 14, wherein the first physical storage device represents a primary data store configured to store more recently accessed data, wherein the second physical storage device represents a secondary data store configured to store less recently accessed data, and wherein the program instructions are further computer-executable to perform routing read requests for data not found in the primary data store to the secondary data store.

19. The non-transitory computer-readable storage medium as recited in claim 14, wherein the first physical storage device is configured to store data items up to a threshold size, wherein the second physical storage device is configured to store data items larger than the threshold size, and wherein the program instructions are further computer-executable to perform storing links at the first physical storage device to the second physical storage device for data items larger than the threshold size.

20. The non-transitory computer-readable storage medium as recited in claim 14, wherein the program instructions are further computer-executable to perform:

receiving, from a plurality of developers, a plurality of available compositions; and listing the plurality of available compositions in a marketplace, wherein the composition is selected for the logical storage device from the plurality of available compositions in the marketplace.

* * * * *